INVENTORS
LAWRENCE L. BEWLEY
JERRY F. FOSTER
BY
Christie, Parker & Hale
ATTORNEYS

CODE WITH TRANSFER ALPHA FORMAT

| CODE MEANING | | IBM CARD CODE | | BUFFER CODE | | COMPUTER CODE | | |
|---|---|---|---|---|---|---|---|---|
| | | ZONE | DIGIT | ZONE | DIGIT | ZONE | DIGIT | |
| BLANK | | – | – | 0 | 0 | 0 | 0 | |
| DECIMAL PT. | . | 12 | 8-3 | 1 | 11 | 0 | 3 | |
| | ¤ | 12 | 8-4 | 1 | 12 | 0 | 4 | |
| | & | 12 | — | 1 | 0 | 1 | 0 | |
| | $ | 11 | 8-3 | 2 | 11 | 1 | 3 | |
| | * | 11 | 8-4 | 2 | 12 | 1 | 4 | |
| | - | 11 | — | 2 | 0 | 2 | 0 | |
| | / | 0 | 1 | 4 | 1 | 2 | 1 | |
| COMMA | , | 0 | 8-3 | 4 | 11 | 2 | 3 | |
| | % | 0 | 8-4 | 4 | 12 | 2 | 4 | |
| | # | — | 8-3 | 0 | 11 | 3 | 3 | |
| | @ | — | 8-4 | 0 | 12 | 3 | 4 | |
| | +0 | 12 | 0 | 5 | 0 | 4 | 0 | |
| | A | 12 | 1 | 1 | 1 | 4 | 1 | |
| | B | 12 | 2 | 1 | 2 | 4 | 2 | |
| | C | 12 | 3 | 1 | 3 | 4 | 3 | |
| | D | 12 | 4 | 1 | 4 | 4 | 4 | |
| | E | 12 | 5 | 1 | 5 | 4 | 5 | |
| | F | 12 | 6 | 1 | 6 | 4 | 6 | |
| | G | 12 | 7 | 1 | 7 | 4 | 7 | |
| | H | 12 | 8 | 1 | 8 | 4 | 8 | |
| | I | 12 | 9 | 1 | 9 | 4 | 9 | |
| | -0 | 11 | 0 | 6 | 0 | 5 | 0 | |
| | J | 11 | 1 | 2 | 1 | 5 | 1 | |
| | K | 11 | 2 | 2 | 2 | 5 | 2 | |
| | L | 11 | 3 | 2 | 3 | 5 | 3 | |
| | M | 11 | 4 | 2 | 4 | 5 | 4 | |
| | N | 11 | 5 | 2 | 5 | 5 | 5 | |
| | O | 11 | 6 | 2 | 6 | 5 | 6 | |
| | P | 11 | 7 | 2 | 7 | 5 | 7 | |
| | Q | 11 | 8 | 2 | 8 | 5 | 8 | |
| | R | 11 | 9 | 2 | 9 | 5 | 9 | |
| | S | 0 | 2 | 4 | 2 | 6 | 2 | |
| | T | 0 | 3 | 4 | 3 | 6 | 3 | |
| | U | 0 | 4 | 4 | 4 | 6 | 4 | |
| | V | 0 | 5 | 4 | 5 | 6 | 5 | |
| | W | 0 | 6 | 4 | 6 | 6 | 6 | |
| | X | 0 | 7 | 4 | 7 | 6 | 7 | |
| | Y | 0 | 8 | 4 | 8 | 6 | 8 | |
| | Z | 0 | 9 | 4 | 9 | 6 | 9 | |
| ZERO | 0 | 0 | — | 4 | 0 | 8 | 0 | |
| | 1 | — | 1 | 0 | 1 | 8 | 0 | |
| | 2 | — | 2 | 0 | 1 | 8 | 1 | |
| | 3 | — | 3 | 0 | 3 | 8 | 3 | |
| | 4 | — | 4 | 0 | 4 | 8 | 4 | |
| | 5 | — | 5 | 0 | 5 | 8 | 5 | |
| | 6 | — | 6 | 0 | 6 | 8 | 6 | |
| | 7 | — | 7 | 0 | 7 | 8 | 7 | |
| | 8 | — | 8 | 0 | 8 | 8 | 8 | |
| | 9 | — | 9 | 0 | 9 | 8 | 9 | SIGN |
| | | 12 | — | | | 0 | | TIME |
| | | 11 | — | | | 1 | | ONLY |

FIG. 2.

INVENTORS
LAWRENCE L. BEWLEY
JERRY F. FOSTER
BY Christie, Parker & Hale
ATTORNEYS INVENTORS
LAWRENCE L. BEWLEY
JERRY F. FOSTER
BY
Christie, Parker & Hale
ATTORNEYS INVENTORS
LAWRENCE L. BEWLEY
JERRY F. FOSTER
BY
Christie, Parker & Hale
ATTORNEYS Jan. 8, 1963 L. L. BEWLEY ET AL 3,072,328

DATA CONVERSION SYSTEM

Filed June 26, 1957 10 Sheets-Sheet 5

| ZONE DIGIT | PREVIOUS NUMERIC DIGIT | ZONE DECADE |
|---|---|---|
| 0 | 0 | 0 |
| 0 | 3 OR 4 | 1 |
| 1 | 0 | 1 |
| 1 | 3 OR 4 | 2 |
| 2 | 0 | 2 |
| 2 | 1,3 OR 4 | 4 |
| 3 | 3 OR 4 | 0 |
| 4 | 0 | 5 |
| 4 | 1→9 | 1 |
| 5 | 0 | 6 |
| 5 | 1→9 | 2 |
| 6 | 2→9 | 4 |
| 8 | 0 | 4 |
| 8 | 1→9 | 0 |

INVENTORS
LAWRENCE L. BEWLEY
JERRY F. FOSTER
BY
Christie, Parker & Hale
ATTORNEYS INVENTORS
LAWRENCE L. BEWLEY
JERRY F. FOSTER
BY
Christie, Parker & Hale
ATTORNEYS

| ROW COUNTER | | FROM BUFFER DRUM ZONE | FROM BUFFER DRUM NUMERIC |
|---|---|---|---|
| 14 | → | 1 OR 5 | |
| 15 | → | 2 OR 6 | |
| 0 | → | 4 | 0 |
| 1 | → | | 1 |
| 2 | → | | 2 |
| 3 | → | | 3 OR 11 |
| 4 | → | | 4 OR 12 |
| 5 | → | | 5 |
| 6 | → | | 6 |
| 7 | → | | 7 |
| 8 | → | | 8, 11 OR 12 |
| 9 | → | | 9 |

HIGH LEVEL OUTPUT

INVENTORS
LAWRENCE L. BEWLEY
JERRY F. FOSTER
BY
Christie, Parker & Hale
ATTORNEYS INVENTORS
LAWRENCE L. BEWLEY
JERRY F. FOSTER
BY
Christie, Parker & Hale
ATTORNEYS Jan. 8, 1963 L. L. BEWLEY ET AL 3,072,328

DATA CONVERSION SYSTEM

Filed June 26, 1957 10 Sheets-Sheet 9

INVENTORS
LAWRENCE L. BEWLEY
JERRY F. FOSTER
BY
Christie, Parker & Hale
ATTORNEYS INVENTORS
LAWRENCE L. BEWLEY
JERRY F. FOSTER
BY
Christie, Parker & Hale
ATTORNEYS 3,072,328
Patented Jan. 8, 1963

3,072,328

DATA CONVERSION SYSTEM

Lawrence L. Bewley, Covina, and Jerry F. Foster, Arcadia, Calif., assignors to Burroughs Corporation, Detroit, Mich., a corporation of Michigan Filed June 26, 1957, Ser. No. 668,154
7 Claims. (Cl. 235—61.1)

This invention relates to data conversion apparatus and, more particularly, is concerned with converting data from an electronic digital computer to standard punched card form or to printed form.

In co-pending application Serial No. 668,179, filed June 26, 1957, now Patent 3,000,556, Sept. 19, 1961, in the names of the present inventors, there is described a data conversion system for transferring information from punched cards directly into an electronic digital computer. The use of punched cards for storing information to be used in commercial business and accounting machines is well known. Because punched cards are in such general use today, it is desirable that punched card information be made directly available in response to calculations made by electronic digital computing devices.

By the present invention a data conversion system is provided for punching cards according to information derived from an electronic computer or for printing information by means of a tabulating machine. The conversion system is capable of utilizing the full speed and capacity of the computing machine. The conversion system provides a means for translating purely numeric information put out in words of fixed digital length by the computer to alphanumeric form for use in the card punch or tabulating machines. The conversion system is capable of spreading out the words from the computer into appropriate fields for punching or printing in desired columns on the cards or tabulating sheets.

In brief, the present invention contemplates storage of an intermediate or buffer magnetic drum between the computer output register and the card punch machine (or tabulating machine). Format control bands on the buffer drum are used to program the transfer of information bits onto or off the buffer drum. Format control can provide straight transfer or purely numeric transfer of digital information, or can insert blanks to spread out the information to desired fields of the card, or can delete digits. By executing various ones of these four functions for each digit from the computer, the data transfer apparatus can keep track of which digits are pure numeric and which are alphanumeric in character. The buffer drum further provides a means for changing in two transfer steps the binary coded decimal digit information from the computer to the standard IBM code for punching or printing in conventional form.

For a better understanding of the invention, reference should be had to the accompanying drawings, wherein:

FIG. 2 is a table showing the correlation between the standard IBM card, the buffer drum code, and the computer code used for translating the standard alphanumeric characters;

Figure 1:
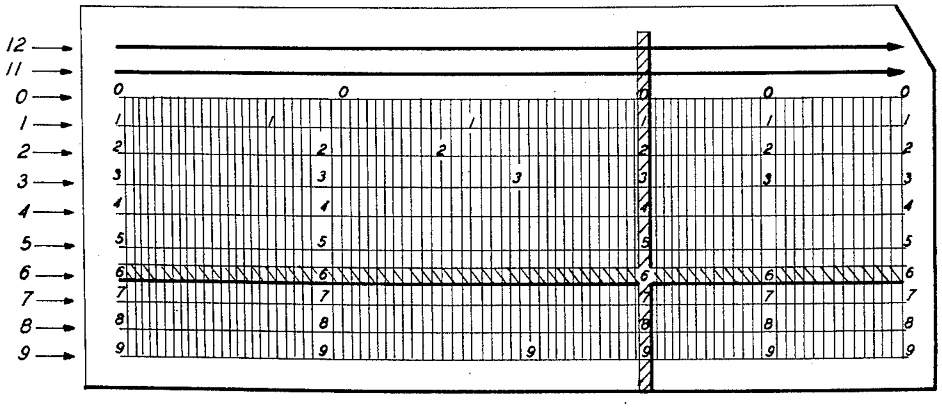
FIG. 1 is a replica of a standard IBM punched card.

Referring to FIG. 1, there is shown a standard IBM punch card. The punch positions on the card are defined by twelve horizontal rows designated from the top down as the 12 row, 11 row and 0 through 9 rows. The card is also divided into eighty vertical columns. Numbers are stored in the punch card by punching each digit of the number in the corresponding row of the card. Generally, certain columns are set aside for numbers representing one type of information, i.e., numbers representing an account number, or a dollar balance etc. These specific columns on the punch card are referred to as information fields.

Letters and other symbols are represented by two or more punches in each column. Thus, the twenty-six letters of the alphabet involve one punch in the 12, 11 or 0 rows and a second punch in the 1 through 9 rows, according to the standard IBM card code. The punches in the 12, 11 and 0 rows are referred to as over-punches, the 12, 11 and 0 rows being referred to as zone rows in contrast to the remaining digit rows referred to as numeric rows. FIG. 2, in the next to the left-hand column, shows the rows by number which are punched to represent a given decimal number, letter or standard symbol as set froth in the left-hand column according to the standard IBM code.

Figure 3:
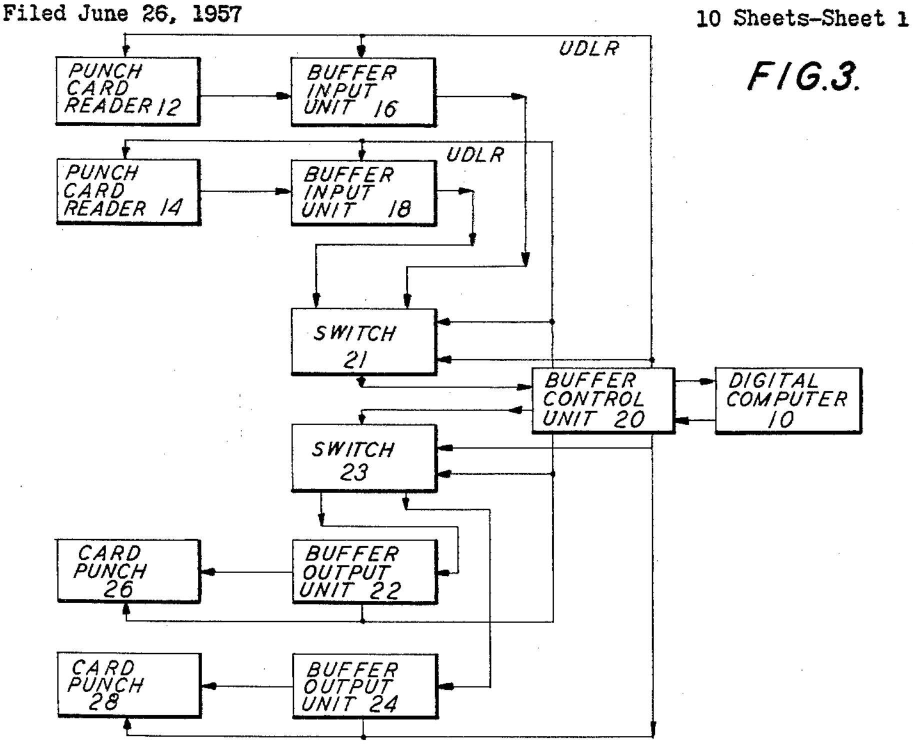
FIG. 3 is a block diagram of the complete converter.

Referring to FIG. 3, there is shown a block diagram of the main components of the data conversion system. The numeral 10 indicates generally a digital computer, which is preferably of a binary-coded decimal type, such as particularly described in an article entitled "Engineering Description of the Electrodata Digital Computer" by John C. Alrich, appearing in the Transactions of the IRE, Professional Group On Electronic Computers, vol. EC–4, No. 1, March, 1955. Information is fed into the digital computer from selected ones of a plurality of punch card reader units, such as indicated at 12 and 14. The punch card reader units are standard machines available on the market for reading punch cards, the reader units required for the present invention preferably being of a type having at least two reading positions or stations, i.e., two positions in which the punched information on the cards can be read out electrically. (See Patent No. 2,275,396.)

The information read out of each punch card reader for each card fed through the reader is stored temporarily in a buffer input unit, such as indicated at 16 and 18. The buffer input units include a format control by which the form of the information appearing on the punch cards may be rearranged in a selected manner as required for proper operation of the digital computer 10. The buffer input units store the information in modified form, referred to as the buffer code.

Information stored in the buffer input units is fed into the digital computer 10 through a buffer control unit 20. The buffer control unit 20 selects one of the buffer input units by means of a selection switch 21, and controls the transfer of information to the computer, dividing the information received from the selected buffer input unit into standard word lengths for feeding into the registers of the digital computer 10. At the same time the buffer control unit 20 compresses or modifies the information transferred, as required by the format control in the buffer input unit. The buffer control unit 20 receives commands from the digital computer 10 by which it selects one of several punch card reader units and also by which it controls the transfer of information from the card readers to the buffer input units, and from the buffer input units to the digital computer. Input operation is described in detail in the above-identified co-pending application.

The buffer control unit 20 also receives output information from the digital computer 10. It transfers, by means of a switching circuit 23, output information to any one of a number of buffer output units, as indicated at 22 and 24, by means of which a plurality of card punch units, such as indicated at 26 and 28, may be controlled to record information from the computer 10 in punched-card form. Instead of punch card machines on output, standard printing or tabulating machines may be used.

The buffer control unit 20, in conjunction with the buffer output units 22 and 24, modifies and rearranges the information received from the computer according to format control information stored in the selected buffer output unit to spread out the information in the desired fields on the punch card in any selected manner. Thus, 10-digit words plus sign information from the computer where the digits in the words have alphanumeric significance, must be converted to numeric and zone punches on the punched card, the punches being positioned in selected columns in the proper fields on the punched card (or tabulating sheet).

Figure 4:
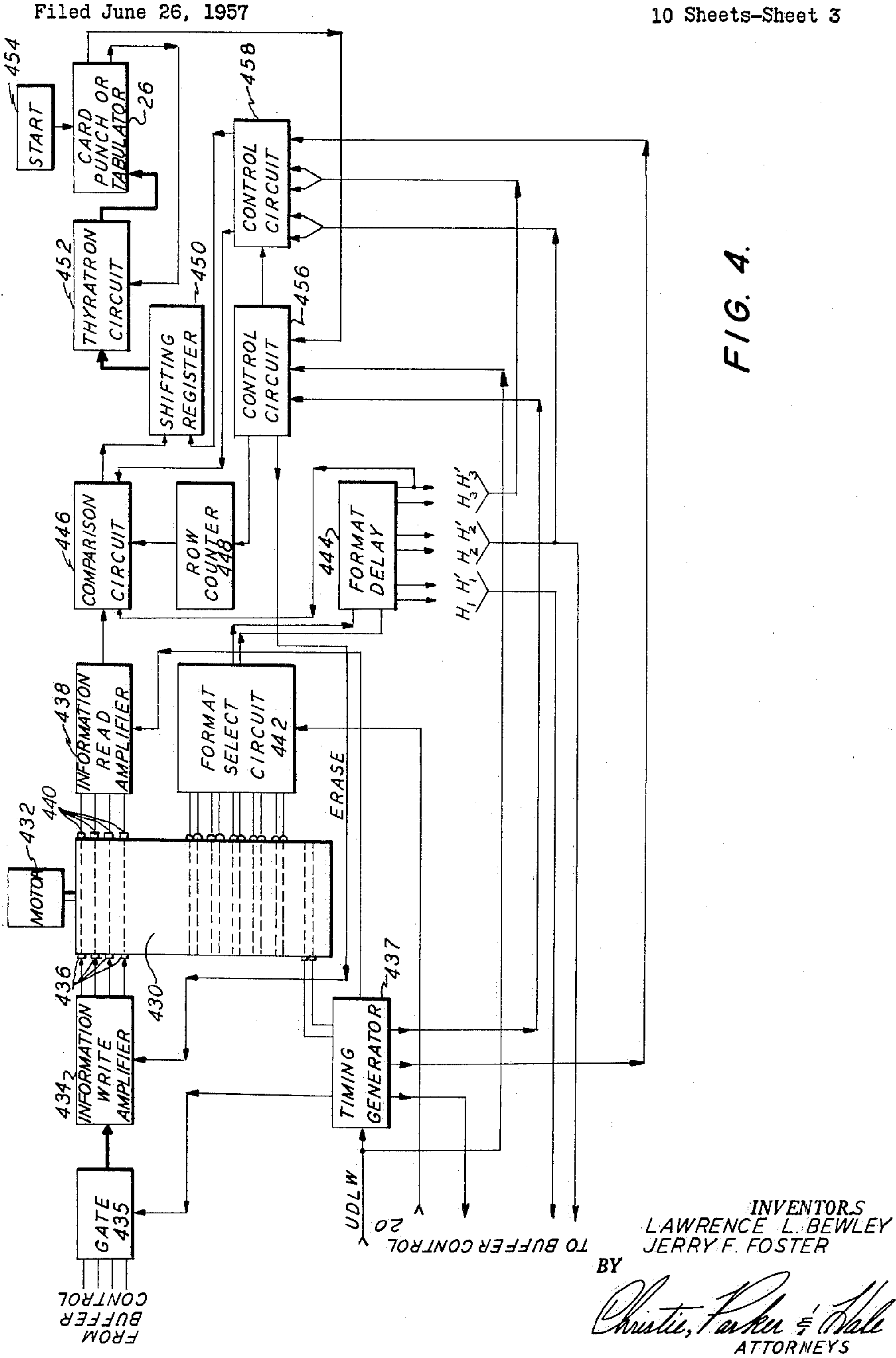
FIG. 4 is a block diagram of the buffer output unit.

Referring to FIG. 4, there is shown in block diagram form the main elements comprising a buffer output unit. Each buffer output unit includes a magnetic buffer drum 430 rotated at high speed by a motor 432. Information derived from the computer 10 through the buffer control unit 20 is recorded on four information tracks on the drum 430 through information write amplifier 434 which drives four recording heads 436. The information write amplifier is connected to the buffer control unit output through a gate 435 which is pulsed by a timing generator 437 to provide pulses for recording on the drum. The information from the buffer unit is received as potential levels on four lines connected to the selected output unit by switching means 23 (see FIG. 3).

The output buffer drum contains two timing tracks which together generate a total of 320 pulses for one revolution of the drum, one of the 320 pulses being contained in one track and the remaining 319 pulses being contained in the other track. Pulses from the timing track on the drum are fed to the timing generator 437 from which selectively delayed pulses for programming the operation of the buffer output unit are derived.

The buffer control unit 20, in a manner hereinafter more fully described, converts digital information from the computer to the same buffer code as used on the input buffer drum (see FIG. 2). The buffer coded information from the computer is stored on the four information tracks of the drum 430 from which it can be read out by an information read amplifier 438 in response to the output of suitable reading heads 440.

The magnetic recording drum 430 also contains five bands of format information, each band comprising two tracks. A format select circuit 442, in response to command information from the computer 10, selects one of the five bands, the selected format band being used to control the manner in which the computer information is ultimately translated into the punched cards. The output from the format select circuit 442 goes to a format delay circuit 444 from which the format information can be derived with different amounts of delay being introduced. Format delay may consist of a number of toggles which are successively triggered, or may be any other suitable means for deriving the format information at successively delayed intervals. The successive outputs from the format delay 444 are designated $H_1$, $H_1'$; $H_2$, $H_2'$; $H_3$, $H_3'$; respectively, the format information $H_1$, $H_1'$ occurring first in point of time following the reading out of a format command from the drum.

There is a format command in each band for each of the 319 information positions around the drum. Two tracks for each format band provide one of four possible binary numbers for each of the 319 information positions around the periphery of the drum. These four format codes, which are stored as the binary equivalents of the decimal digits 0, 1, 2 and 3, respectively, are called the "Insert Blank" format, the "Transfer Alphabetic" format, the "Transfer Numeric" format, and the "Delete Digit" format. The purpose of the "Transfer Numeric" format is to transfer all the digits from the computer as purely numeric, thus simplifying the transfer operation where no over-punches are required on the punched card for alphanumeric data. The action of the various format commands will be brought out as the description proceeds.

The output from the read amplifier 438 is fed to a comparison circuit 446 which compares each binary-coded decimal digit as received from the buffer drum with the number established on a row counter and matrix circuit 448. If a comparison exists a pulse is shifted into a shifting register 450. After a complete revolution of the buffer drum 430, during which a comparison is made for each of the binary-coded digits stored on the drum, the resulting pattern stored on the shifting register 450 is used to actuate punches in the punched card unit 26.

As the card moves through the card punch unit 26 under the control of a start toggle 454, it steps forward the row counter 448 by means of a control circuit 456, the row counter always being maintained one count ahead of the particular row coming under the punches in the card punch unit. Thus, as one row is being punched on the card the next row is being compared in the comparison circuit 446 and fed to the shifting register 450.

The shifting register 450 is shifted at least eighty times (120 times where used with a tabulating machine) by shifting pulses derived from a control circuit 458. The control circuit 458, by means of format information derived from the format delay 444, selects shifting pulses from the 319 timing pulses derived from the timing generator 437, for shifting the register 450. The final pattern on the shifting register is read out in parallel through a thyratron driver circuit 452 to actuate the punches in desired columns on the card being punched (or printing bars in the tabulator).

Figure 5:
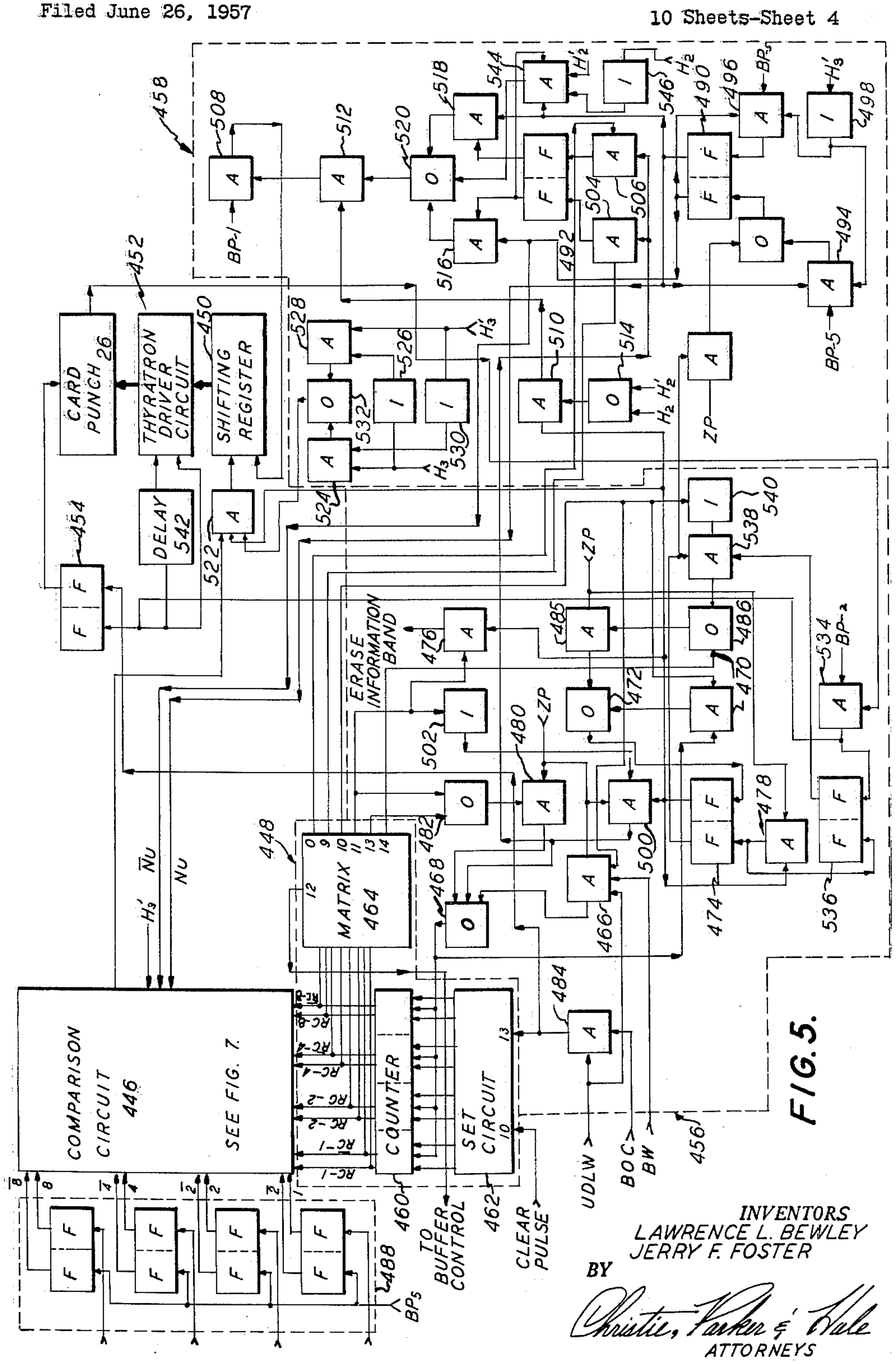
FIG. 5 is a more detailed block diagram showing the operating logic of the circuit for translating from the buffer drum to the card punch machine in a buffer output unit.

Considering the buffer output unit in more detail, as shown in FIG. 5, the row counter and matrix circuit 448 includes a binary counter 460 which may be either stepped or may be set through a set circuit 462. Each of the four toggles comprising the binary counter 460 is connected to the comparison circuit 446 in a manner shown in detail in FIG. 7, and also to a diode matrix circuit 464 by means of which a high potential level can be set on different output lines corresponding to certain different count conditions on the counter 460. The count conditions 0, 9, 10, 11, 13 and 14 in particular are used in the control of the buffer output unit.

As shown in the graphical time plot of FIG. 6*b*, the row counter 460 is initially set in its count 10 condition. This is accomplished by a "clear" pulse fed into the set circuit 462. The clear pulse may be manually produced by the momentary closing of a switch (not shown), and is used to preset all the toggles in the buffer input and output units as well as buffer control. The counter is then stepped to its count 11 condition by a zero pulse ZP derived from the timing generator 437 and gated to the counter through an "and" circuit 466 in the control circuit 456. The "and" circuit 466 is gated open in response to three conditions, namely, that the command in the computer has energized the UDLW line from the buffer control 20 designating the particular buffer output unit. The second condition for gating open the "and" circuit 466 is that a command from the computer, interpreted in the buffer control unit, establishes that the computer is ready to write on an output buffer unit. In response to this command, as will hereinafter become apparent, a high potential level is produced on a line going to the buffer control unit, the line being designated BW. The third condition for gating open the "and" circuit 446 is that the counter be set in the count 10 condition, as determined by a high potential level set on the corresponding output line from the matrix 464. When these three conditions are met, the next zero pulse is coupled by the "and" circuit 466 to the counter 460 through an "or" circuit 468 to trigger the counter to its count 11 condition.

The output of the "or" circuit 468 is also coupled to another "and" circuit 470 connected to the count 10 output line from the matrix circuit 464, whereby the stepping pulse which steps the counter to its count 11 condition is passed by the "and" circuit 470 through an "or" circuit 472 to trigger on a revolution (Rev) toggle 474. The Rev toggle 474 is connected to an "and" circuit 476 together with the count 11 condition line from the matrix circuit 464, whereby the "and" circuit 476 produces an output when the counter is in its count 11 condition and the Rev toggle 474 is in its on condition. The output of the "and" circuit 476 is connected to the information write amplifiers for biasing on an erase current through the writing heads 436, thereby erasing any previous information on the buffer drum 360.

The next zero pulse, one revolution of the drum later, triggers off the Rev toggle 474 through an "and" circuit 478 which is gated open in response to the "on" condition of the Rev toggle 474. Thus the Rev toggle 474 is only triggered on for one revolution of the buffer drum 430 (see FIG. 6*c*). At the same time the next zero pulse is used to to step the counter 460 to the count 12 condition, the zero pulse being coupled to the counter through an "and" circuit 480 which is gated on by the count 11 condition line from the matrix circuit 464 through an "or" circuit 482. The zero pulse passed by the "and" circuit 480 is used to step the counter 460 to the count 12 condition by coupling it to the stepping input of the counter through the "or" circuit 468.

Once the counter 460 is in its count 12 condition, information is transferred from the computer onto the buffer drum by means of the buffer control unit 20, in a manner hereinafter more fully described. For this purpose a count 12 condition line is connected from the matrix circuit 464 of the selected output unit back to the buffer control unit 20 through the switching circuit 23.

When the information is transferred from the computer onto the buffer drum of the selected buffer output unit, a pulse is generated by the buffer control unit, referred to as the buffer output control (BOC) pulse which is coupled through an "and" circuit 484 in the control circuit 456 to the "set 13" input of the set circuit 462. Only the "and" circuit 484 in the selected buffer control output unit is gated open, this being in response to the selected UDLW line from the buffer control unit 20. Thus the counter 460 is set to its count 13 condition.

At the same time, the output from the "and" circuit 484 is used to trigger on the start toggle 454 which controls the card punch machine 26. With the toggle 454 triggered on, a relay in the card punch machine 26 is closed, thereby energizing a clutch and starting the card with its 12 row first through the punch station. The card punch machine 26 is a standard piece of equipment by means of which any one of a selected number of eighty columns on the punch card can be punched one row at a time. The card punch includes eighty relay-operated punch elements which when energized punch a hole on the card as it passes beneath the punch station.

With the row counter in its count 13 condition, the "and" circuit 480 is gated open by the appropriate line from the matrix circuit 464 through the "or" circuit 482. Thus the next zero pulse is passed by the "and" circuit 480 to step the row counter 460 to its count 14 condition. With the row counter 460 in its count 14 condition, an "and" circuit 485 is opened in response to the appropriate output lines from the matrix circuit 464 through an "or" circuit 486 to gate the next zero pulse to the Rev toggle 474, triggering it on.

It is while the Rev toggle is on that the first comparison is made in the gating circuit 446 between the numbers read off the buffer drum and the row number as established by the counter 460. To this end the four information channels are connected through the information read amplifier 438 to a decade 488 comprising four toggles which are triggered on in response to the binary digit one from the corresponding track on the buffer drum. Thus each successive binary-coded digit on the buffer drum is stored momentarily on the decade 488, the decade being cleared by the next buffer pulse so as to receive the next successive binary coded number from the buffer drum until all 319 information positions during one revolution of the drum have been successively stored on the decade 488.

While the Rev toggle 474 is triggered on, shifting pulses are fed to the shifting register 450. This is accomplished by the control circuit 458 which includes a numeric toggle 490 and a row toggle 492. The numeric toggle 490 is normally triggered to alternate conditions by buffer pulses in correspondence with the alternate zone and numeric information positions on the buffer drum. Thus buffer pulses BP–5 are coupled through "and" circuits 494 and 496 to opposite sides of the toggle 490. The "and" circuit 494 is gated open in response to two conditions, namely, the toggle 490 must be triggered to its "on" condition and format must call for "Transfer Alphabetic." The desired format command condition is established by connecting the $H_3'$ format level from the format delay circuit 444 through an inverter 498 to the "and" circuit 494. The "and" circuit 496 in turn is gated open in response to two conditions, namely, that the toggle 490 be triggered to its "off" condition and the format command be for "Transfer Alphabetic." Accordingly, the "and" circuit 496 is also connected to the inverter 498 and to the opposite side of the toggle 490. It will be seen that as long as the format command remains "Transfer Alphabetic," the toggle 490 is complemented by successive buffer pulses BP–5.

The row toggle 492 is triggered by zero pulses ZP gated through an "and" circuit 500 in the control circuit 456. The "and" circuit 500 is gated open in response to the Rev toggle 474 whenever the row counter 460 is not in the count 11 condition, as determined by connecting the "and" circuit 500 through an inverter 502 to the output 11 line of the matrix circuit 464.

The resulting pulses derived from the output of the and circuit 500 are coupled to respective sides of the toggle 492 through "and" circuits 504 and 506 which are respectively gated open in response to the count 9 condition of the counter 460 and the count 0 condition of the counter 460. This is accomplished by connecting the "and" circuits 504 and 506 to the proper output lines from the matrix 464. Thus it will be seen that the toggle 492 is triggered to one condition following the count 9 condition on the counter and remains in this condition through all the zone row counts of 14, 15 and 0, and is flipped to the opposite condition following the count 0 condition of the counter 460, remaining in this condition for all the numeric row counts of 1 through 9 of the row counter 460.

Shifting pulses are fed to the shifting register 450 by means of buffer pulses passed by an "and" circuit 508. Since first the "and" circuit 508 only wants to be gated open when the Rev toggle 474 is in its "on" condition, the Rev toggle is connected to the "and" circuit 508 but through a pair of "and" circuits 510 and 512. The "and" circuit 512 determines that the "and" circuit 508 will be gated on only when the Rev toggle 474 is triggered on and when the format command is not "Insert Blank." This is provided by gating the "and" circuit 510 on by an "or" circuit 514 connected to both channels $H_2$ and $H_2'$ of the format delay circuit 444.

The "and" circuit 512 further provides that a shifting pulse is applied to the shifting register 450 only when the row toggle 492 and the numeric toggle 490 are both in their zone condition or both in their numeric condition. This is determined by connecting the off side of both the toggles 490 and 492 to an "and" circuit 516 and connecting the opposite sides of toggles 490 and 492 to an "and" circuit 518. The outputs of the "and" circuit 516 and 518 are connected to the "and" circuit 512 through an "or" circuit 520. Thus only when both toggles 490 and 492 are in their "off" condition, which is true only during zone time for the zone rows, does the output of the "and" circuit 516 gate open the "and" circuit 512. Correspondingly, when both the toggles 490 and 492 are in their "on" condition, as is true at numeric time for numeric rows, the "and" circuit 518 gates open the "and" circuit 512. Any other condition of the toggles 490 and 492 prevents the "and" circuit 512 from being gated open and thus prevents shifting of the shifting register 450.

With the row counter 460 at the count 14 condition and the Rev toggle 474 triggered on, shifting pulses begin to flow to the shifting register 450, which for "Transfer Alphabetic" format occur in response to alternate buffer pulses. At the same time successive zone and numeric digits from the buffer drum are being read into the decade 488. The gating circuit 446 takes each number as it is stored on the decade 488, and compares it with the count condition of the row counter 460. The gating circuit is further controlled by the numeric toggle 490 whereby the comparison can be made on the basis of whether a zone digit or a numeric digit is stored in the decade 488. For "Transfer Numeric" format command, all the numbers stored on the decade 488 are to be given a numeric interpretation. Thus a comparison can exist only when the counter 460 is in the count 0 condition of the three zone rows 0, 11 and 12. In order that the gating circuit will make a comparison when the row counter is in the count 0 condition in response to the equivalent numeric digit on the buffer drum, the gating circuit must also receive format information. For this reason the gating circuit is connected to the $H_3'$ output of the format delay circuit 444.

Figure 7:
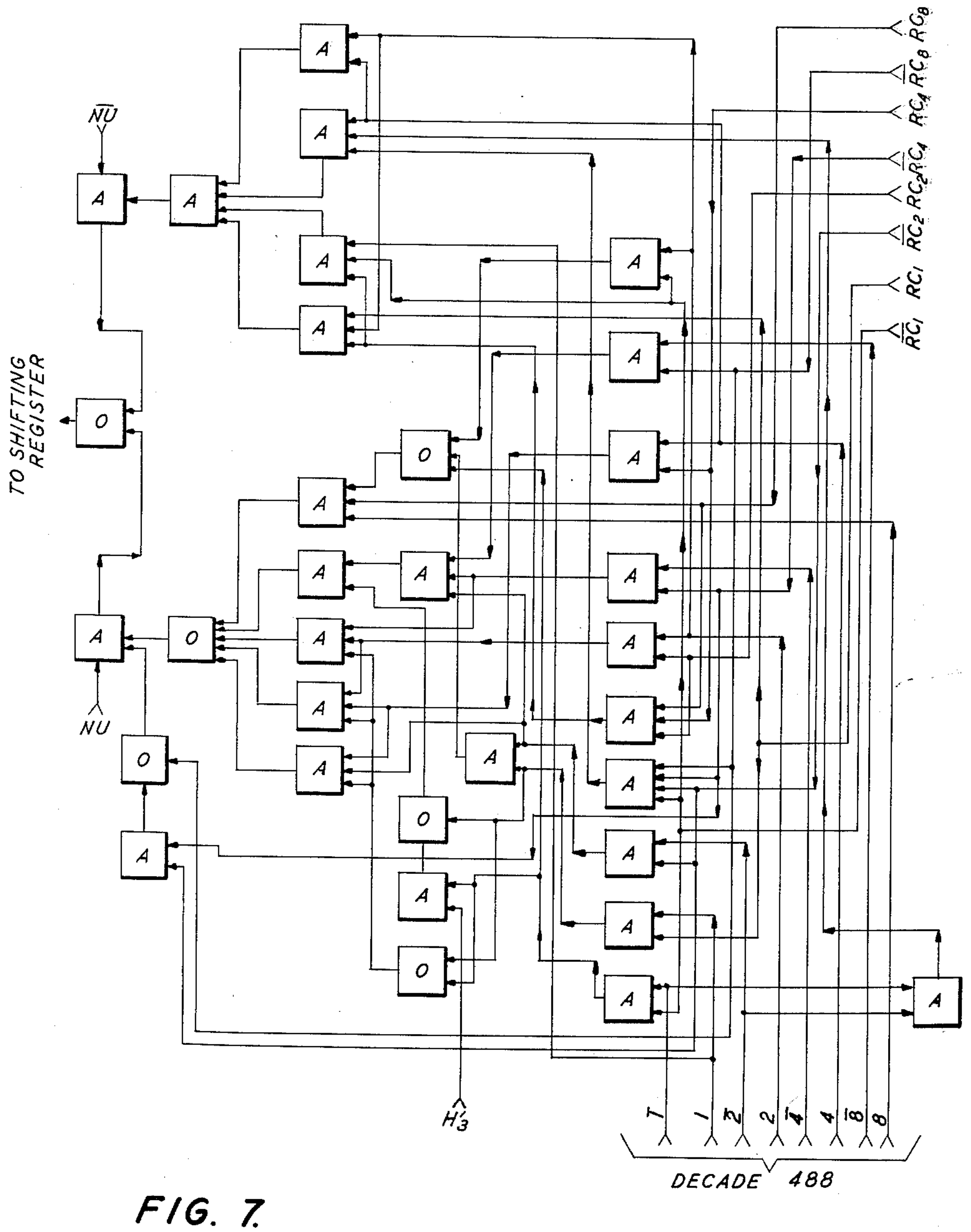
FIG. 7 is a detailed block diagram showing the operating logic of the comparison gating circuit of FIGS. 4 and 5.

The comparison circuit 446 is shown in detail in FIG. 7. It is a conventional logic circuit comprising "and" and "or" circuits which are connected to effect the code translation from the buffer drum code to the punched card code as set forth in the table of FIG. 2. The action of the comparison circuit is summarized in the table of FIG. 8.

Figures 8, 13:
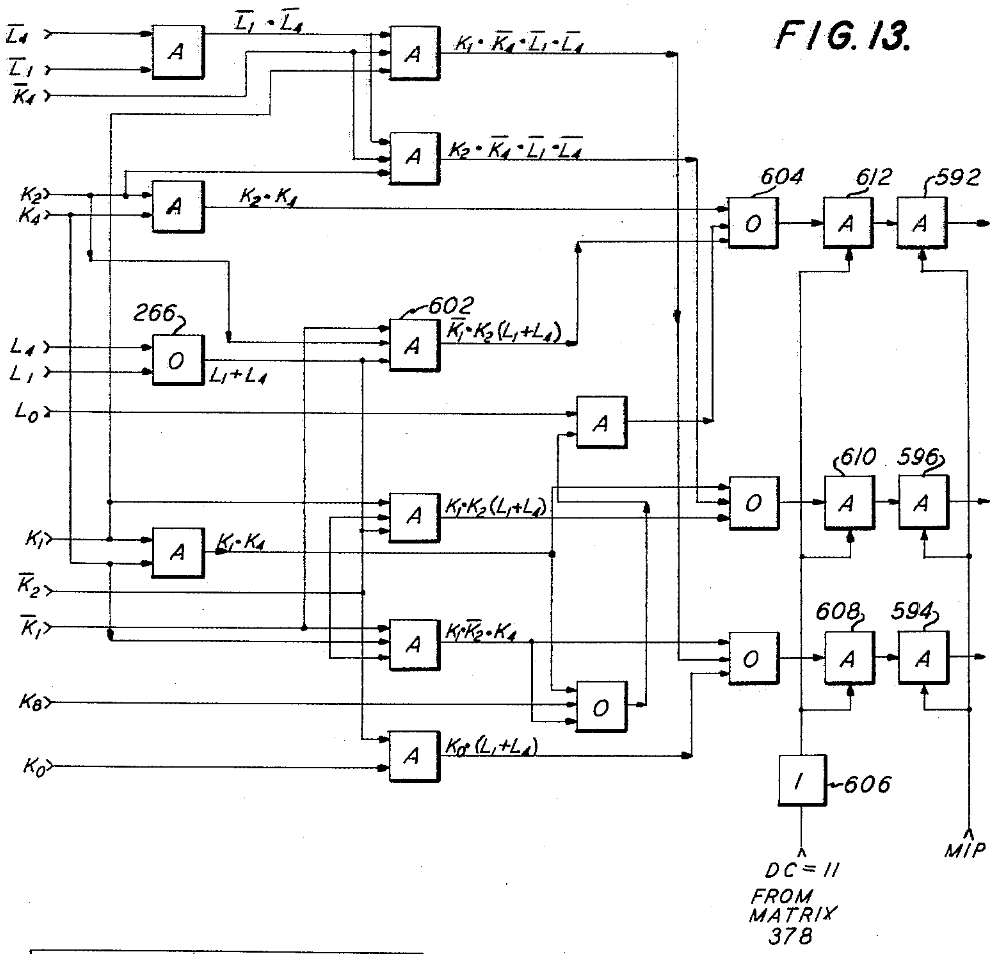
FIG. 8 is a table showing the comparison function performed by the comparison circuit of FIG. 7.
FIG. 13 is a detailed block diagram showing the operating logic of the gating circuit in the translator f FIG. 11.

As shown in the table of FIG. 8, a high level output is produced by the gating circuit 446 with the row counter in any of the count conditions set forth in the left hand column when the number from the buffer drum has the value shown in the next two columns and the numeric toggle 490 is set for either zone or numeric digits. It will be seen that only for the count 0 condition is a high level output produced by two different numbers, depending on whether the numeric toggle is in the zone or numeric condition. This must be provided because both a 4 in a zone information position on the buffer drum and a 0 in the numeric information position must translate as a punch in the zero row on the punch card.

When the gating circuit indicates a proper comparison between the row counter condition and the digit read in from the buffer drum, the resulting high level potential on the output of the gating circuit 446 is applied to an "and" circuit 522. The "and" circuit 522 is also controlled by the Rev toggle 474 so that it can be gated on only during the time the Rev toggle is triggered on. The "and" circuit 522 is also controlled by format such that the "and" circuit can be gated on only for the "Transfer Alphabetic" format and for the "Transfer Numeric" format. This is accomplished by connecting the $H_3$ format channel from the format delay circuit 444 to an "and" circuit 524 and through an inverter 526 to an "and" circuit 528. Also the $H_4'$ channel from the format delay circuit is connected to the "and" circuit 524 through an inverter 530 and also is connected to the "and" circuit 528. Thus the "and" circuit 524 produces a high level output for the "Transfer Alphabetic" format and the "and" circuit 528 produces a high level output in response to the "Transfer Numeric" format. The output of the "and" circuits 524 and 528 are connected to the "and" circuit 522 through an "or" circuit 532.

In this way a binary 1 is introduced into the shifting register by a shifting pulse occurring when the "and" circuit 522 is gated on, whereas a binary 0 is introduced into the shifting register whenever the "and" circuit 522 is gated closed. With one complete revolution of the buffer drum during which the Rev toggle 474 is gated on, a pattern therefore is established on the shifting register by means of which selected columns on the punch card may be punched in a given row of the card punch corresponding to the count condition of the row counter 460.

Figures 6, 12:
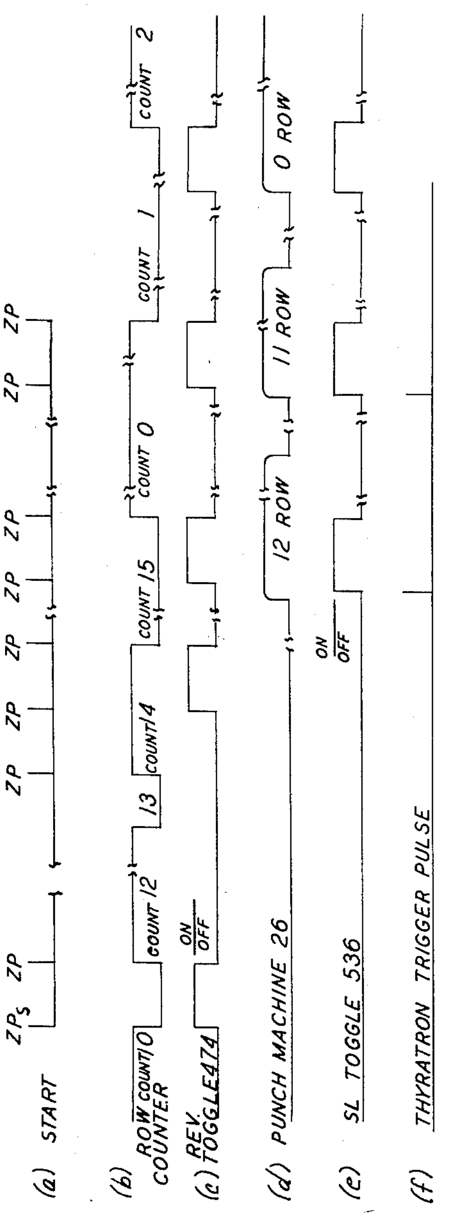
FIG. 6 is a timing diagram showing the sequence of operation of the circuit in FIG. 5.
FIG. 12 is a table showing the translation of zone information on output as performed by the translating circuit of FIG. 11.

Returning to the sequence of events as depicted in FIG. 6, with the row counter in the count 14 condition, the pattern for punching the 12 row of the card is established on the shifting register 450 in the manner above-described. The row counter 460 is then stepped to its count 15 condition by the same zero pulse ZP that triggers the Rev toggle to its "off" condition through the "and" circuit 478. Thus a zero pulse is coupled to the "and" circuit 500, which is gated open by virtue of the fact that the Rev toggle 474 is in its "on" condition, and the row counter 460 is not in its count 11 condition as determined by the output of the inverter circuit 502. The zero pulse ZP is passed by the "and" circuit 500, passed by the "or" circuit 468 to step the row counter 460 to its count 15 condition. At the same time the output from the "and" circuit 500 resets the row toggle 492.

The row counter 460 remains in the count 15 condition until the card moves in the card punch machine to a position where the 12 row is in the punch station. The card punch machine 26 puts out a pulse (see FIG. 6*d*) during the interval the row 12 is in position under the punches, which pulse gates open an "and" circuit 534 in the control circuit 456 permitting the next buffer pulse to trigger on a start load (SL) toggle 536 (see FIG. 6*e*). Triggering on the SL toggle 536 gates on an "and" circuit 538, provided the Rev toggle 474 is in its "off" condition and the row counter 460 is not in its count 10 condition, as established by respectively connecting the "and" circuit 538 to the off side of the toggle 474 and connecting it to the count line 10 output of the matrix 464 through an inverter 540. As a result the "and" circuit 484 is gated open and the next occurring zero pulse ZP triggers the Rev toggle 474 on. With the Rev toggle 474 triggered on and with the row counter 460 on its count 15 condition, a new comparison is made in the gating circuit between the condition of the row counter 460 and each of the numbers stored on the buffer drum, by which means a new pattern is established on the shifting register 450 for the 11 row of the card in the card punch unit 26.

However, it will be noted by the time reference diagram of FIG. 6, the card still has its 12 row in the punching station at the time the Rev toggle 474 is triggered on and the counter is in the count 15 condition. Actual punching of the card is done in response to the shifting register 450 just before the Rev toggle 474 is triggered on. To this end the shifting register is connected in parallel to a plurality of thyratrons in the thyratron driver circuit 452. Each of the thyratrons is in series with a relay (not shown) which controls the punch for each column in the card punch unit. The buffer pulse passed by the "and" circuit 534 may be connected to the control grids of each thyratron in the driver circuit 452, for example, while the screen grids of each of the thyratrons may be connected to the respective toggles in the shifting register 450, for example. Thus all the thyratrons which have their screen grids raised to a high level in response to a binary digit 1 stored in the associated toggle in the shifting register 450 are caused to fire by the pulse derived from the "and" circuit 534. Selected ones of the punches in the card punch unit are thereby actuated substantially with the start of the pulse derived from the card punch unit when the card moves in position under the punch element. The same pulse that fires the thyratrons is coupled through a delay circuit 542 to a relay in the thyratron driver circuit 452, the delayed pulse actuating the relay to break the plate circuit of the thyratrons after a sufficient length of time to permit operation of the punch elements. This extinguishes the thyratrons in preparation for punching the next row.

The output pulse from the "and" circuit 534 is also used to trigger off the starting toggle 454, so that after a particular card is passed through the card punch machine 26, the machine stops until the start toggle 454 is again triggered on in response to the buffer control unit. After one complete revolution of the buffer drum, the Rev toggle 474 and the SL toggle 536 are both triggered off and the row counter 460 is advanced to its next count condition. The above sequence is repeated when the next pulse is put out by the card punch unit 26 as the card moves into position with its 11 row in the punch station. The sequence of operation continues until the 9 row of the card goes through the punch station at which time the card punch machine 26 stops and no further action occurs until the computer selects the buffer output unit for further action, at which time the row counter is set to its count 11 condition and the above described cycle is repeated for the next card in the punch card unit 26.

With the "Transfer Numeric" format each number received from the buffer drum with that format has to be treated as a numeric digit, even the 0 digits. As pointed out above, with the "Transfer Numeric" format, the "and" circuits 494 and 496 are not gated open and so the toggle 490 is not complemented but remains in the "on" condition corresponding to the numeric transfer condition. If the row toggle is also set to the numeric transfer condition by virtue of the fact that the row counter 460 is in one of the count conditions 1 through 9, the "and" circuit 512 will remain open and successive buffer pulses, instead of alternate buffer pulses, are transferred for shifting the register 450.

However, as has been noted previously in connection with FIGS. 5 and 7, when the row counter 460 is in its count 0 condition and a "Transfer Numeric" format is provided, a 0 on the buffer drum must produce a punch in the 0 row of the card. Since the row toggle 492 is now in its "off" condition, corresponding to the zone transfer condition, normally no shifting pulses would be received by the register 450, since the numeric toggle 490 normally remains in its "on" condition for each "Transfer Numeric" format. To permit shifting of the shifting register under the condition of "Transfer Numeric" format with a count 0 condition of the row counter 460, "and" circuit 544 is provided in the control circuit 458. The "and" circuit 544 raises the output level from the "or" circuit 520 so as to gate open the "and" circuit 508 when the following conditions exist, namely, when the numeric toggle 490 is triggered on, corresponding to the numeric condition; when the row toggle 492 is triggered off, corresponding to the zone condition; and when the format command is "Transfer Numeric." The format command is established by connecting the $H_2$ channel of the format delay through an inverter 546 to the "and" circuit 544 and connecting the $H_2'$ channel of the format delay directly to the "and" circuit 544, whereby the "and" circuit is gated open only when the "Transfer Numeric" format code is stored in the format delay 444.

Figure 9:
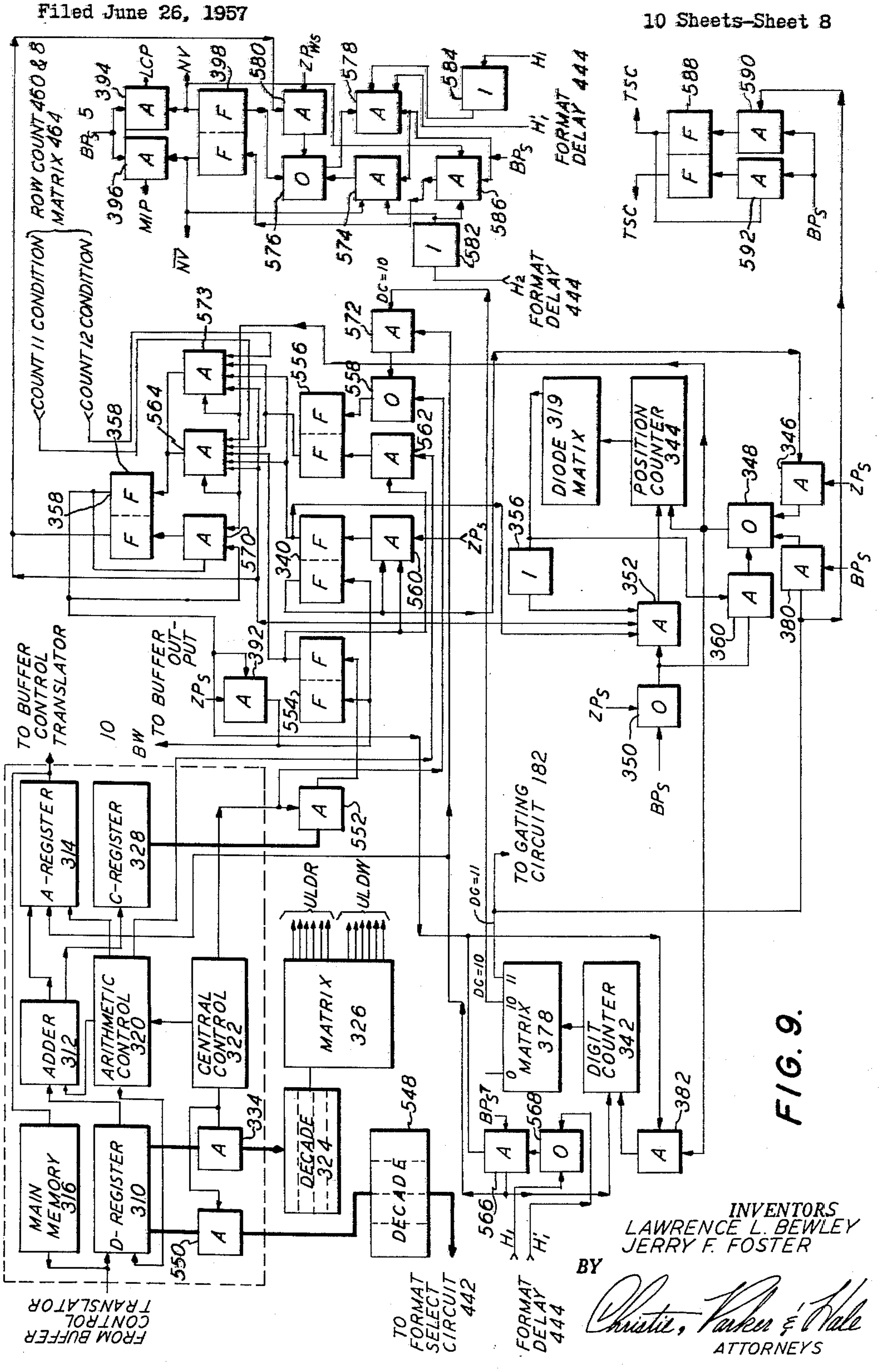
FIG. 9 is a block diagram of the control circuits in the buffer control unit and the associated computer.
Figure 10:
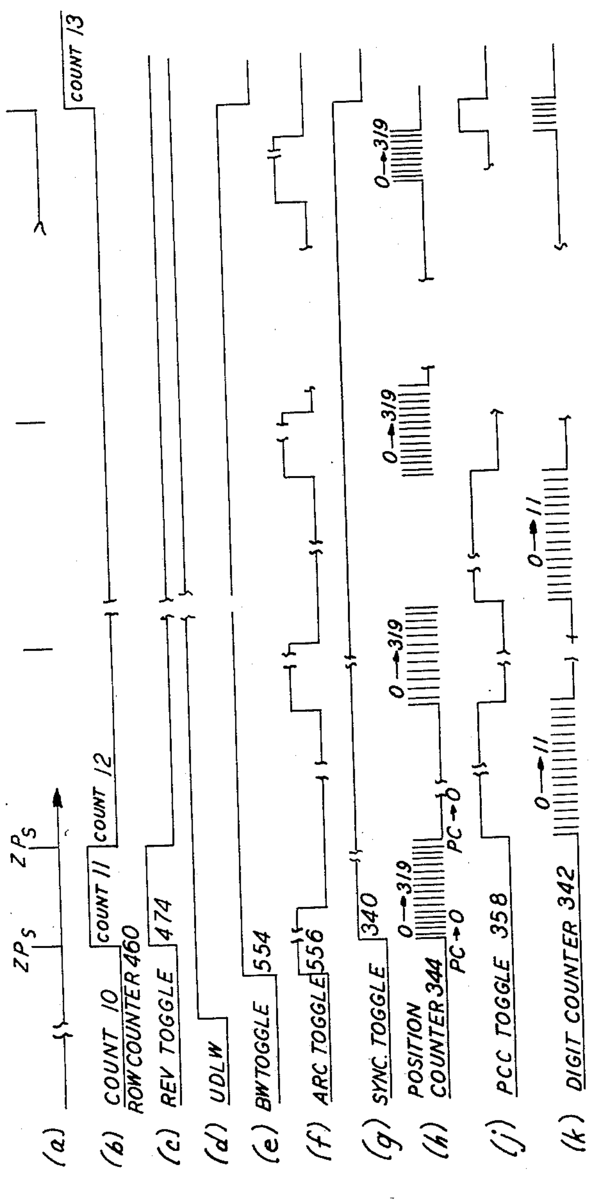
FIG. 10 is a timing diagram showing the sequence of operation of the circuits in FIG. 9.

Considering FIG. 9 in detail together with the timing diagram of FIG. 10, the control portion of buffer control unit 20 is shown together with the computer 10. A command is first read into the D-register 310 of the computer 10 from main memory 316 by means of central control 322. The command contains information, which may be read into the decade 324 through the "and" circuit 334 in response to a pulse from central control 322, by which one of the buffer output units is selected. The selected unit is designated by means of a line from the matrix 326, designated ULDW, according to the command information fed into the decade 324. At the same time a second decade of four toggles, indicated at 548, receives command information from the D-register 310 through an "and" circuit 550 gated open momentarily in response to an output pulse from the central control 322. The decade 548 contains the information for selecting the desired format band on the buffer drum 430 of the selected buffer output unit.

The command information in the D-register is then shifted through the adder 312 into the command or C-register 328. If the command sets a predetermined pattern on selected ones of the toggles in the C-register 328, an "and" circuit 552 is gated open so as to pass a pulse from the central control 322 to trigger on a buffer write (BW) toggle 554, indicating that the computer order is to write on an output buffer drum (see FIG. 10e).

At the same time, the control pulse from the central control unit 322 of the computer 10 triggers on an A-register control (ARC) toggle 556 through an "or" circuit 558.

The buffer write toggle 554 controls an "and" circuit 560 on the input of a sync toggle 340. The "and" circuit 560 is also controlled by the sync toggle 340 so that the next zero pulse from the buffer drum of the selected buffer output unit triggers on the sync toggle 340 (see FIG. 10g). The sync toggle 340 thereby synchronizes further operation of the buffer control unit 20 with the selected buffer output unit.

When the sync toggle 340 is triggered on, an "and" circuit 352 is gated open and passes zero and buffer pulses from the buffer drum of the selected output unit through an "or" circuit 350 to a position counter 344 of the binary type capable of counting up to 319 input pulses. The counter is caused to count through its 319 count positions.

The first computer word is read into the A-register 314 by operation of the computer 10, the arithmetic control unit 320 putting out a pulse when the A-register is full. This pulse is coupled through an "and" circuit 562 to the ARC toggle 556 to trigger it off, indicating that the A-register is full. The ARC toggle 556 controls an "and" circuit 564 on the input to a position counter control (PCC) toggle 358. The "and" circuit 564 is gated on in response to five conditions, namely, the BW toggle 554 must be triggered on, the sync toggle 340 must be triggered on, the PCC toggle 358 must be triggered to its "off" condition, the ARC toggle 556 must be triggered to its "off" condition, and the row counter of the selected buffer output unit must be in its count 11 condition. When the position counter 344 reaches its count 319 condition, an "and" circuit 360 is gated open by means of a diode matrix 354 driven by the counter, passing the next buffer pulse $BP_5$ from the "or" circuit 350 to an "or" circuit 348. This provides a stepping pulse which returns the position counter to its count 0 condition. The same pulse from the output of the "or" circuit 348 is also passed by the "and" circuit 564 to trigger the PCC toggle 358 to its "on" condition. At the same time the row counter in the buffer output unit is triggered to its count 12 condition and the Rev toggle in the buffer output unit is triggered off. This sequence is evident from FIG. 10.

The PCC toggle 358 controls an "and" circuit 566 which passes delayed buffer pulses $BP_s$–7 from the selected output unit buffer drum to the stepping input of a binary digit counter 342 capable of counting eleven input pulses. The "and" circuit 566 is under the control of format by means of an "or" circuit 568 connected to the $H_1$ and $H_1'$ output channels from the format delay circuit 444 of the selected buffer output unit. Thus the "and" circuit 566 is only gated on for formats other than the "Insert Blank" format. The output of the "and" circuit 566 is also connected to the shifting input of the A-register 314, whereby the computer word in the A-register is shifted out at the same time the digit counter 342 is advanced.

Under the "Insert Blank" format, shifting of the information in the A-register is interrupted so that no information is transferred to the translator portion of the control unit for writing on the buffer output unit drum at the corresponding information position on the drum. Thus a zero results on the drum at the information position having an "Insert Blank" format associated therewith.

When the digit counter is stepped to its count 11 condition and the A-register is empty, the "and" circuit 380 is gated open in response to the line 11 output from a matrix 378 connected to the counter 342. The next buffer pulse from the selected buffer output unit is connected by an "and" circuit 380 and "or" circuit 348 to an "and" circuit 570 for triggering off the PCC toggle 358, the "and" circuit 570 being gated open at the time in response to the "on" condition of the PCC toggle 358.

In the interim, when the digit counter 342 is still in its count 10 condition, an "and" circuit 572 is gated open permitting the next shifting and stepping pulse from the output of the "and" circuit 566 to trigger the ARC toggle to its "on" condition (see FIG. 10*f*).

With the PCC toggle 358 triggered off, the position counter 344 again counts out one revolution. If the ARC toggle 556 is now triggered off again, indicating that the A-register has stored the next word, the pulse put out when the position counter 344 returns to its count 0 condition triggers on the PCC toggle 358. This is accomplished by an "and" circuit 573 coupling the zero pulse from the "or" circuit 348 to the PCC toggle 358. The "and" circuit 573 is gated open when the PCC toggle 358 is off, the sync toggle 340 is on, the ARC toggle is off, and the row counter 460 in the selected buffer output unit is in the count 12 condition. The "and" circuit 566 is thereby gated on, so as to produce stepping of the A-register 314 and of the digit counter 342.

This process continues for each word appearing in the A-register 314 until such time as the buffer drum in the buffer output unit is completely filled, at which time a zero pulse ZP will occur while the PCC toggle 358 is triggered on. As a result, a pulse is passed by the "and" circuit 392 gated open by the PCC toggle 358. This pulse, designated BOC, triggers off the BW toggle 554 as well as the sync toggle 340. This same pulse may be used to reset various other toggles and the counters in a well-known manner so that the buffer control unit 20 may be pre-set in preparation for the next group of information from computer 10 required for the next punch card, either in the same selected buffer output unit or in some other selected buffer output unit.

A numeric toggle 398 in the buffer control unit 20 is controlled during output by buffer pulses from the drum of the selected buffer output unit. The toggle 398 is triggered on by buffer pulses gated through an "and" circuit 574 and an "or" circuit 576, or gated through an "and" circuit 578 and the "or" circuit 576. Also the toggle 398 is triggered on by zero pulses ZP from the selected buffer output unit gated by an "and" circuit 580, the "and" circuit 580 being gated open when the PCC toggle 358 is triggered to its "off" condition.

The "and" circuit 574 is gated open in response to format only if the toggle 398 is in its "off" condition. The "and" circuit 574 is connected to the $H_2$ channel output of the format delay circuit 444 through an inverter 582, whereby the "and" circuit 574 may be gated open only for the "Insert Blank" format and the "Alphabetic Transfer" format.

The "and" circuit 578 is gated open only during the "Transfer Numeric" format and therefore is connected to the $H_1$ channel of the format delay 444 through an inverter 584 and is also connected directly to the $H_1'$ channel of the format delay 444.

The numeric toggle 398 is triggered off by buffer pulses gated through an "and" circuit 586 which is connected to the $H_2$ channel of format delay 444 by an inverter 582 and also to the "on" side of the toggle 398. Thus the "and" circuit 586 is gated open only when the toggle 398 is triggered on and when the format is "Insert Blank" or "Alphabetic Transfer." The "and" circuits 394 and 396 are connected to buffer pulses from the selected output unit to generate the LCP pulses and the MIP pulses for use in the translator portion of the buffer control unit 20 during the punch card writing operation.

A sign time (TSC) toggle 588 is also provided in the buffer control unit which is triggered on by buffer pulses gated through an "and" circuit 590. The "and" circuit 590 in turn is gated open by the line 11 output of the matrix 378. Thus the toggle 588 is triggered on at the time the last digit of the computer word, which is sign information, is shifted out of the A-register 314. The toggle 588 is triggered off by the next buffer pulse, which is passed by an "and" circuit 592, the latter being gated open by the toggle 588 when it is in its "on" condition.

Figure 11:
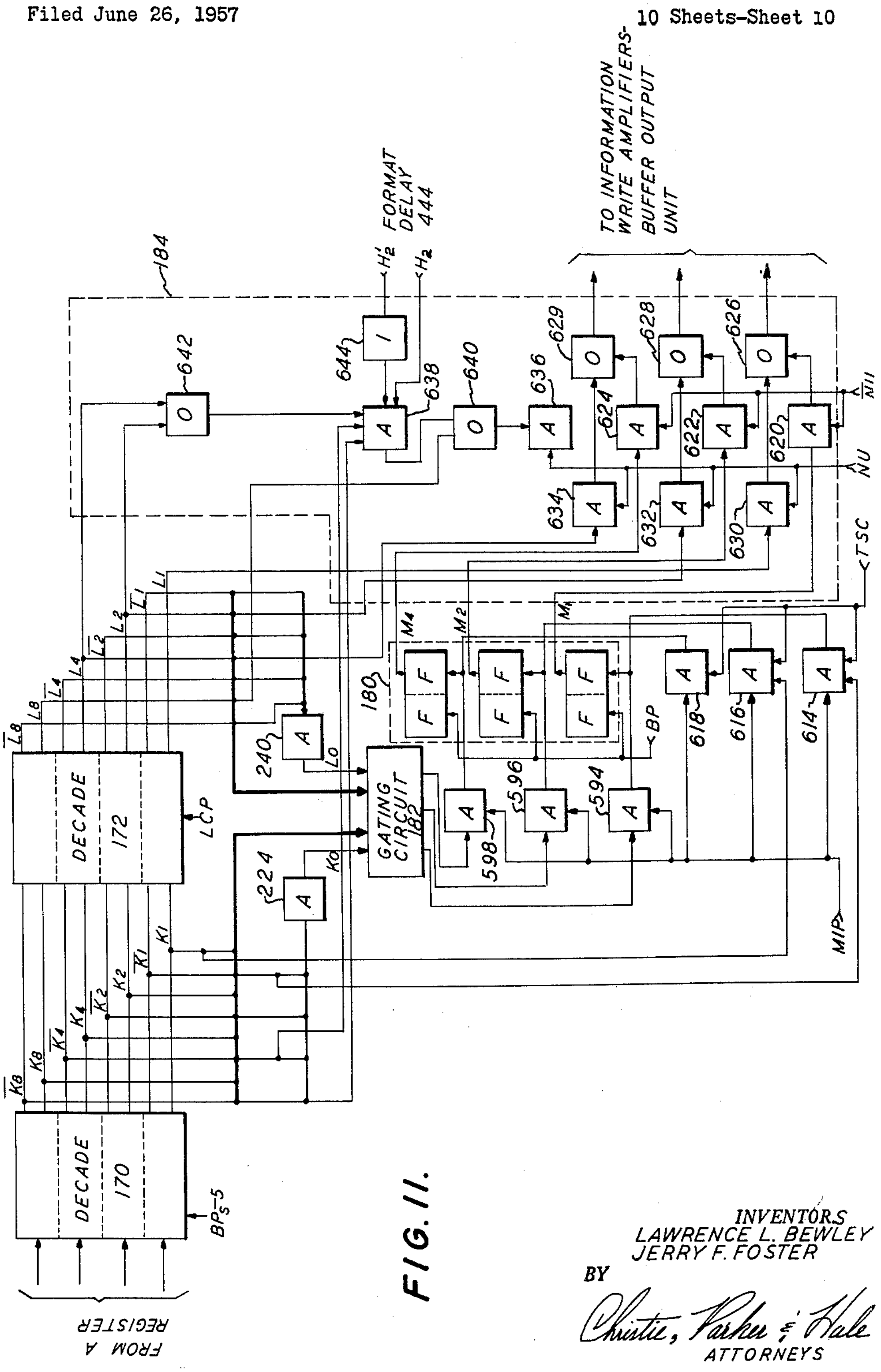
FIG. 11 is a detailed block diagram of the translator showing the operating logic of the circuit for translating from the computer to the output buffer drum.

Referring to FIG. 11, the translator circuit in the buffer control unit 20 is shown, by means of which information from the A-register is translated into the buffer code for recording on the buffer drum of the selected buffer output unit. The four channels of the A-register are coupled respectively to the four toggles comprising an input decade 170, the decade being cleared and all of the toggles put in their "off" condition by delayed buffer pulses $BP_s$–5 from the selected output buffer drum. Each of the toggles of the input decade 170 is connected to corresponding toggles in a numeric decade 172 and to a gating circuit 182. Similarly, the gating circuit 182 is connected to the output of each of the toggles in the numeric decade 172. The gating circuit 182 is also connected to the line 11 output of the matrix circuit 378 associated with the digit counter 342 in the buffer control unit 20. The decade 172 is cleared by LCP pulses, the LCP pulses being generated in the buffer control unit 20 in the manner described above in connection with FIG. 10.

The outputs of the numeric decade 172 and the zone decade 180 are connected to an output transfer circuit in the translator, indicated generally at 184.

The gating circuit 182 on output is connected to the three toggles of a zone decade 180 by selectively gating on three "and" circuits indicated at 594, 596 and 598. Only three toggles in the zone decade 180 are used on output since the buffer code for zone, as seen from the table of FIG. 2, involves no digit higher than 6. The particular "and" circuits gated open by the output of the gating circuit 182 pass MIP pulses derived from buffer pulses by means of the numeric toggle 398 (see FIG. 10) in the buffer control unit 20 to trigger on the associated toggles in the zone decade 180.

The gating circuit 182, as shown in detail in FIG. 13, includes a plurality of "and" circuits and "or" circuits connected to carry out the logic required by the code transformation, as set forth in the table of FIG. 12, when transferring information from the computer to the buffer drum. Thus if the zone digit on the decade 170 is a 2, for example, and the previous numeric digit, as stored on the numeric decade 172, is the digit 1, 3 or 4, the resulting digit stored in binary-coded form on the zone decade 180 is a 4. This is set forth in FIG. 12 by picking out the zone digit in the left hand column and the previous numeric digit in the center column, the resulting digit stored on the buffer drum then being given in the right hand column.

The operation of the gating circuit 182 for the example given above may be appreciated by examining FIG. 13 where the gating circuit 182 is shown in detail. With the decade 170 having a binary-coded 2 stored in it, the $\overline{K}_1$ line, the $K_2$ line, the $\overline{K}_4$ line, and the $\overline{K}_8$ line are accordingly raised to a high potential by the toggles in the input decade 170. With the numeric decade 172 having a 1, 3, or a 4 stored on it by the previous numeric digit received from the computer, either the $L_1$ line or the $L_4$ is raised to a high potential by the corresponding toggles in the decade 172. With the $\overline{K}_1$ line, the $K_2$ line and either the $L_1$ or $L_4$ line being raised to a high potential, an "and" circuit 602 in the gating circuit 182 has the output thereof raised to a high level. The output of the "and" circuit 602 is connected to the "and" circuit 598 through an "or" circuit 604, whereby the "and" circuit 598 is gated open. However, it can be seen by inspection that neither of the "and" circuits 594 nor 596 are gated open and consequently the next MIP pulse sets up a binary coded 4 on the zone decade 180.

Similarly, the pattern on each of the toggles of the zone decade 180 can be ascertained for each zone digit stored on the input decade 170 and the previous numeric digit stored on the numeric decade 172 from the logic diagram of FIG. 10.

It should be noted that at sign time for the computer word being translated into the buffer drum, either a 0 or a 1 will be stored in the input decade 170. It is necessary that this 0 or 1 not be translated as in the normal case, but be translated into the buffer drum as a 5 or a 6. Accordingly, the line 11 output from the matrix circuit 378 is connected through an inverter 606 in the gating circuit 182, the output of the inverter 606 being connected to three "and" circuits, indicated at 608, 610 and 612 respectively. These "and" circuits control the output of the gating circuit 182 as applied to the "and" circuits 594, 596 and 598. It will be seen that only when the digit counter 342 in the buffer output unit 20 is not in its count 11 condition, i.e., when it is not sign time for the computer word, can the output of the gating circuit 182 be used to gate on any of the three "and" circuits 594, 596 or 598.

During sign time a binary-coded 5 or 6 is put on the zone decade 180 by means of three associated "and" circuits 614, 616 and 618, all of which are gated on by the TSC toggle 588 (see FIG. 10) in the buffer control unit 20. As pointed out previously the TSC toggle 588 is triggered on only during sign time and consequently the three "and" circuits 614, 616 and 618 are gated on only during sign time. The "and" circuit 614 is connected to the $\overline{K}_1$ output line from the input decade 170 while the "and" circuit 616 is connected to the $K_1$ line from the input decade 170. Also all three "and" circuits are connected to the MIP pulses. Thus it will be seen that if a 0 or 1 is stored in the input decade 170 at sign time, an MIP pulse is passed by the "and" circuit 618 and either the "and" circuit 614 or the "and" circuit 616, whereby a binary-coded 5 or a 6 is accordingly established on the zone decade 180.

The output of the numeric decade 172 and zone decade 180 are connected to the transfer circuit 184 for transfer to the information write amplifiers of the selected buffer output unit. For this purpose the transfer circuit 184 includes three "and" circuits, indicated at 620, 622 and 624, which are gated on by the numeric toggle 398 in the buffer control unit 20, by means of the line designated $\overline{NU}$ when the numeric toggle is triggered to its "off" condition. These three "and" circuits couple associated toggles in the zone decade 180 through three "or" circuits, indicated at 626, 628 and 630, which in turn are coupled to three of the channels of the information write amplifiers.

Similarly, the four toggles of the decade 172 are connected to four "and" circuits, indicated at 630, 632, 634, and 636, which are gated on by the numeric toggle 398, by means of the line designated N*u*, when the numeric toggle is triggered to its "on" condition. The output of three of these four "and" circuits are connected to the corresponding information write amplifier channels in the selected buffer output unit by the "or" circuits 626, 628, and 629. The "and" circuits 636 is connected to the remaining information write amplifier channel.

It should be noted that for certain special characters a straight one-to-one transfer of the digits stored on the numeric decade 172 to the buffer drum cannot be used. It can be seen from FIG. 2 that a 3 or 4 digit stored in the numeric decade 172 is transferred to the buffer drum as an 11 or 12 respectively whenever the following associated zone digit is the digit 0, 1, 2 or 3. For this reason an "and" circuit 638 is provided in the transfer circuit 184, the "and" circuit 638 controlling the "and" circuit 636 through an "or" circuit 640. The "and" circuit 638 is gated open in response to three basic conditions. The first condition is that a 3 or a 4 be stored in the numeric decade 172. This is established by connecting the "and" circuit 638 through an "or" circuit 642 to the $L_2$ line and the $L_4$ line from the numeric decade 172. The second condition is that the zone digit stored in the input decade 170 be either a 1, 2, 3 or 4. This is ascertained by connecting the "and" circuit 638 to the $\overline{K}_8$ line and the $\overline{K}_4$ line of the input decade 170. The third condition is that the format be "Transfer Alphabetic." This is ascertained by connecting the "and" circuit 638 to the $H_2$ output channel of the format delay circuit 444 and to the $H_2'$ output channel of the format delay circuit 444 through an inverter 644. The format control is introduced since it is desired that the special characters involved in the modification of the 3 and 4 digits only occur where a "Transfer Alphabetic" format is involved.

It will be evident from the above description that format control in the output provides selection of a group of instructions which permit the card converter to scan the computer words to be read out of the computer to the card machine, eliminating unwanted information and arranging the desired information in a more useful form. By means of format, 160 or fewer computer digits are compressed into 80 or fewer punch card columns (or 240 or fewer digits into 120 or fewer columns where a tabulating machine is used), the computer digits being selected from as many as 29 computer words. By permitting two computer digits to form one output column on the punch card, format permits the transfer of alphabetic information to the punch card machine. Since it is not always necessary, however, to sense two computer digits to produce an output column, as where a purely numeric field is being transferred, format permits all computer digits, with the exception of sign digits, to be interpreted as pure numeric.

The operation of output format instructions in the buffer control unit and in the buffer output unit is believed evident from the above description but will be reviewed briefly by way of summary. The "Insert Blank" format results in no information being punched in the zone or numeric portion of the card column. It is provided in the circuit by not shifting the A-register in the computer so that no information is recorded on the buffer drum at the corresponding position. If the format command results in a blank being inserted in a zone portion of a column, the next information bit that is transferred, deleted, or inserted as a blank is treated as numeric information, and vice versa, if the blank is inserted in a numeric portion of the column, the next information bit transferred, deleted, or inserted as a blank is treated as zone information. Thus the "Insert Blank" format instruction has zone-numeric significance. There fore to create a blank column on the punch card, two "Insert Blank" format instructions must be provided consecutively, one for numeric and one for zone. The creation of blank columns is a major use of the "Insert Blank" format instruction and permits the spacing out of fields on the punch card.

The "Transfer Alphabetic" format is always used in transferring alphabetic information from the computer to the card machine. With the "Transfer Alphabetic" format instruction every other computer digit is treated as zone information. To use this instruction for purely numeric information from the computer, it is used alternately with the "Insert Blank" format instruction, the "Transfer Alphabetic" format instruction being used at numeric time.

Rather than filling all the zone information positions on the buffer drum with zeros by the "Insert Blank" format, for purely numeric information the "Transfer Numeric" format instruction is provided. By this instruction the corresponding information position on the buffer drum is always treated as numeric. It should be noted, however, that to reproduce sign information on the punch card as an over-punch, a sign digit occurring at sign time must be interpreted as zone information. Therefore, the "Transfer Alphabetic" format instruction is used with the numeric digit in the computer word occurring just before sign time.

The "Delete Digit" format is used to eliminate undesired computer digits during output, permitting the selection of eighty or fewer output columns from as many as twenty-nine computer words. This format has no zone-numeric significance, i.e., if the digit deleted was numeric, the next digit is treated as numeric. Therefore, in deleting digits from alphabetic words, this format is always used in pairs, except at sign time. It is always necessary to delete the signs of alphabetic computer words.

What is claimed is:

1. Apparatus for translating coded information from a digital computer having an output shifting register on which computer words are stored to a card punch machine in which the punches are inserted in horizontal rows and vertical columns on the card, said apparatus comprising a buffer magnetic storage drum having clock pulses recorded thereon for dividing the drum periphery into a predetermined number of information storage positions, the buffer drum further having recorded thereon at least one format control band in which predetermined commands are recorded in pulse form for each of the information positions, means for transferring in sequence the digit pulse information in the output shifting register to the buffer storage drum including means responsive to the format commands recorded in the format band for gating clock pulses from the buffer drum to the shifting input of the shifting register in the computer output, whereby the digits are only transferred to the drum at times corresponding to selected ones of the information positions around the drum as determined by the associated format command, means for punching the punch card in selected columns a row at a time, means including a storage register coupled in parallel to the punching means for activating selected punches according to the pattern stored on the storage register, comparison means responsive to the row to be punched and the successive digits from the buffer drum, the comparison means being connected to the storage register for generating an input pulse to the storage register whenever a predetermined comparison relation exists, means for shifting the storage register, whereby the pattern of pulses generated by the comparison means is shifted serially in the storage register and means for coupling clock pulses to the means for shifting the storage register, said coupling means including gating means responsive to format commands recorded on the format band of the buffer drum, whereby the storage register is shifted at times corresponding to selected ones of the information positions on the buffer drum as determined by the associated format commands.

2. Apparatus for translating coded information from a digital computer having an output shifting register on which computer words are stored to a card punch machine in which the punches are inserted in horizontal rows and vertical columns on the card, said apparatus comprising a buffer magnetic storage drum having clock pulses recorded thereon for dividing the drum periphery into a predetermined number of information storage positions, the buffer drum further having recorded thereon at least one format control band in which predetermined commands are recorded in pulse form for each of the information positions, means for transferring in sequence the digit pulse information in the output shifting register to the buffer storage drum including means responsive to the format commands recorded in the format band for gating clock pulses from the buffer drum to the shifting input of the shifting register in the computer output, whereby the digits are only transferred to the drum at times corresponding to selected ones of the information positions around the drum as determined by the associated format command, means for punching the punch card in selected columns a row at a time, means including a storage register coupled in parallel to the punching means for activating selected punches according to the pattern stored on the storage register, comparison means responsive to the row to be punched and the successive digits from the buffer drum, the comparison means being connected to the storage register for generating an input pulse to the storage register whenever a predetermined comparison relation exists, and means for shifting the storage register for serially shifting the input pulses from the comparison means through the storage register.

3. Apparatus for translating coded information from a digital computer having an output shifting register in which computer words of a fixed number of digits are stored in electrically coded form to a card punch machine in which the punches are inserted in horizontal rows and vertical columns on the card, said apparatus comprising a buffer magnetic storage drum having clock pulses recorded thereon for dividing the drum periphery into a predetermined number of information storage positions, means for transferring the computer word stored in the shifting register to the buffer drum in sequence digit by digit, including a counter, gating means operable to gate clock pulses simultaneously to the shifting input of the shifting register and to the counter, means coupling the output of the shifting register to the input of the buffer drum, and means controlled by the counter operable to actuate the gating means to interrupt the flow of clock pulses to the shifting input of the register and to the counter when the counter reaches a predetermined count condition, means for punching the punch card in selected columns a row at a time, means including a storage register coupled in parallel to the punching means for activating selected punches according to the pattern stored on the storage register, comparison means responsive to the row to be punched and the successive digits from the buffer drum, for generating a pulse whenever a predetermined comparison relation exists, the comparison means being connected to the input of the storage register and means for shifting the storage register in synchronism with the clock pulses from the buffer drum.

4. Apparatus for translating binary-coded digital information from a computer in which alphabetic and special characters are represented by a pair of digits referred to as zone digits and numeric digits to an output card punch or printing machine arranged to receive punch or printing information pulses for each of a plurality of columns one digit at a time, said apparatus including a buffer drum having clock pulses recorded thereon for dividing the periphery into a predetermined number of information storage positions, and at least one format band having format commands recorded thereon for each of the information positions, means for transferring the information from the computer to the buffer drum a digit at a time including gating means responsive to the format commands on the buffer drum for modifying the zone digits and the numeric digits from the computer according to a predetermined code, the transferring means further including means responsive to the format commands for transferring zone digits to predetermined zone digit information positions on the drum and transferring numeric digits to predetermined numeric digit information positions on the drum, the zone and numeric information positions being arranged alternately about the periphery of the drum, a storage register having a number of storage positions equal to the number of columns to be printed or punched, means for establishing in pulsed binary-coded form the digit to be received by the output machine at a particular time, comparison means coupled to the output from the buffer drum and to the output of said pulsed binary-coded digit establishing means for producing an output pulse when a predetermined relation exists between the two inputs to the comparison means, the output of the comparison means being coupled to the register, and means for coupling clock pulses from the buffer drum to the shifting input of the register including gating means responsive to the format commands on the buffer drum, whereby selected clock pulses are passed to the register according to predetermined format commands.

5. Apparatus for translating binary-coded digital information from a computer in which alphabetic and special characters are represented by a pair of digits referred to as zone digits and numeric digits to an output card punch or printing machine arranged to receive punch or printing information pulses for each of a plurality of columns one digit at a time, said apparatus including a buffer drum having clock pulses recorded thereon for dividing the periphery into a predetermined number of information storage positions, and at least one format band having format commands recorded thereon for each of the information positions, means for transferring the information from the computer to the buffer drum a digit at a time, a storage register having a number of storage positions equal to the number of columns to be printed or punched, means for establishing in pulsed binary-coded form the digit to be received by the output machine at a particular time, comparison means coupled to the output from the buffer drum and to the output of said pulsed binary-coded digit establishing means for producing an output pulse when a predetermined relation exists between the two inputs to the comparison means, the output of the comparison means being coupled to the register, and means for coupling clock pulses from the buffer drum to the shifting input of the register including gating means responsive to the format commands on the buffer drum, whereby selected clock pulses are passed to the register according to predetermined format commands.

6. Apparatus for shifting information from a shifting register to a storage drum where the drum has a predetermined number of storage positions substantially greater than the number of storage positions in the register, the drum having clock pulses stored therein equal in number to the number of storage positions around the periphery of the drum and for recording one of a plurality of different format commands in digit pulse form on the drum at positions corresponding to each information position on the drum, said apparatus comprising means including gating means responsive to the format commands on the drum for transferring information digits from the register to the drum, the gating means being biased open to permit transfer of information in response to certain ones of the format commands, means including gating means responsive to the format commands on the drum for transferring clock pulses to the shifting input of the register, the gating means being biased open to permit selected transfer of clock pulses in response to certain ones of said format commands, a first pulse counter responsive to the pulses coupled to the shifting input of the register, a second pulse counter responsive to the clock pulses on the drum, and means for gating on the first and second counters alternately when they have respectively counted pulses equal to the information positions in the register and the information positions on the drum.

7. Apparatus for shifting information from a shifting register to a storage drum where the drum has a predetermined number of storage positions substantially greater than the number of storage positions in the register, the drum having clock pulses stored therein equal in number to the number of storage positions around the periphery of the drum, said apparatus comprising means for transferring information digits from the register to the drum, means for transferring clock pulses to the shifting input of the register, a first pulse counter responsive to the pulses coupled to the shifting input of the register, a second pulse counter responsive to the clock pulses on the drum, means for gating on the first and second counters alternately when they have respectively counted pulses equal to the information positions in the register and the information positions on the drum, means controlled by the first counter when it reaches a predetermined count condition for interrupting said means for transferring information digits from the register to the drum and starting the second counter, and means controlled by the second counter when it reaches a predetermined count condition for actuating said means for transferring clock pulses to the shifting input of the register and starting the first counter.

References Cited in the file of this patent

UNITED STATES PATENTS

| | | |
|---|---|---|
| 2,679,638 | Bensky | May 25, 1954 |
| 2,708,267 | Weidenhammer | May 10, 1955 |
| 2,718,356 | Burrell | Sept. 20, 1955 |
| 2,757,864 | Pollard et al. | Aug. 7, 1956 |
| 2,798,554 | Smith | July 9, 1957 |
| 2,817,072 | Chien et al. | Dec. 17, 1957 |
| 2,891,237 | Sink | June 16, 1959 |
| 2,925,589 | Schmitt | Feb. 16, 1960 |